United States Patent [19]

van den Bergh

[11] 4,337,299

[45] Jun. 29, 1982

[54] PROCESS FOR APPLYING A CORROSION RESISTANT TWO-COAT SYSTEM TO STRUCTURAL STEEL AND COATED STEEL THUS OBTAINED

[75] Inventor: Boudewijn van den Bergh, Heerde, Netherlands

[73] Assignee: Akzo NV, Arnhem, Netherlands

[21] Appl. No.: 214,248

[22] Filed: Dec. 8, 1980

[30] Foreign Application Priority Data

Dec. 14, 1979 [NL] Netherlands ........................ 7909016

[51] Int. Cl.$^3$ .............................................. B22F 7/04
[52] U.S. Cl. .................................... 428/562; 427/406; 427/403; 428/551; 428/552; 428/448; 428/450
[58] Field of Search ...................... 106/1, 29; 427/406, 427/403; 428/416, 448, 450, 551, 561, 562, 563, 552

[56] References Cited

U.S. PATENT DOCUMENTS

| | | | |
|---|---|---|---|
| 3,849,141 | 11/1974 | Palm | 427/406 |
| 4,157,924 | 6/1979 | Elms | 148/6.2 |
| 4,186,036 | 1/1980 | Elms | 148/6.2 |
| 4,229,495 | 10/1980 | Takahashi | 427/406 |

FOREIGN PATENT DOCUMENTS

| | | | |
|---|---|---|---|
| 2612154 | 1/1977 | Fed. Rep. of Germany | 427/406 |
| 1307766 | 6/1962 | France | 427/406 |
| 52-63942 | 5/1977 | Japan | 427/410 |
| 55-73372 | 6/1980 | Japan | 427/406 |

*Primary Examiner*—Sam Silverberg
*Attorney, Agent, or Firm*—Stevens, Davis, Miller & Mosher

[57] ABSTRACT

A process is disclosed for applying a corrosion resistant system to structural steel, in which a zinc dust paint comprising 5-15% by weight of a binder and 85-95% by weight of a metallic zinc-based pigment component is applied to the steel as a first coat, and subsequently a coat of a composition comprising an aromatic/aliphatic polyhydroxyether and/or a saturated aromatic polyester resin having a number average molecular weight of at least 4000 and a pigment having a Mohs hardness of at least 2, the volume ratio of the binder to the pigment being in the range of 50:50 to 95:5. The thickness of the first coat is about 15-150 μm and that of the second coat is about 15-150 μm. The invention also relates to structural steel thus coated.

12 Claims, No Drawings

PROCESS FOR APPLYING A CORROSION RESISTANT TWO-COAT SYSTEM TO STRUCTURAL STEEL AND COATED STEEL THUS OBTAINED

This invention relates to a process for applying a corrosion resistant system to structural steel. By structural steel is to be understood here (in conformity with Eurostandard 25-72) beams, sections, piping, bars and other parts of steel structures. These structural members generally have a thickness of at least about 2 mm and are not subject to deformation or bending.

The process according to the invention is characterized in that to the steel there is successively applied a coat of a zinc dust paint based on a binder and a pigment, the weight ratio of binder to pigment being in the range of 5:95 to 15:85 and the pigment consisting of 55 to 100 percent by weight of metallic zinc and a coat of a composition based on a binder in the form of an aromatic/aliphatic polyhydroxyether and/or a saturated aromatic polyester resin having a number molecular weight of at least 4000 and a pigment having a Mohs hardness of at least 2 and the volume ratio of the binder to the pigment is in the range of 50:50 to 95:5, the thickness of the first coat being about 15 to 150 $\mu$m and that of the second coat about 15 to 150 $\mu$m.

An object of the invenion is to provide a protective system imparting excellent resistance to corrosion to structural steel. This excellent resistance to corrosion is of great importance particularly in view of the growing agressiveness of the atmosphere as a result of the increase in $SO_2$-content thereof.

It should be added that from published Netherlands Patent Application No. 74 13 661 it is known that iron or steel plates which are to be deformed in a non-cutting operation may be provided with an undercoat of a zinc dust primer and a top coat of a mixture of 50-70% by weight of a lubricating compound and 50-30% by weight of an organic binder. As lubricating compounds it mentions oil, wax, fat, graphite, molybdenum sulphide and lead sulphide. The total thickness of the two coats together is stated to be 12-25 $\mu$m.

An advantage to the use of the zinc dust paint as the first coat is that the composition and the required coating thickness can easily be adapted to the envisaged field of application. The metallic zinc can be used in any convenient form, for instance as fine particles or flakes. The pigment system may also comprise electrically conductive or semi-conductive pigments, such as finely divided micaceous iron oxide, iron phosphide, aluminium, stainless steel, cadmium and the like. For a further increase in corrosion resistance the composition may still contain, if desired, a small amount of a corrosion resistant pigment or a corrosion inhibitor, for instance, in an amount of not more than 10, and preferably not more than 5 percent by weight, based on the total amount of pigment.

Examples of suitable additives include zinc phosphate, zinc chromate, strontium chromate, barium metaborate, calcium phosphosilicate, calcium borosilicate, calcium ferrite, zinc ferrite and heavy metal salt of 5-nitroisophthalic acid. As binder component in the zinc dust paint practically any suitable agent may be used. Examples of suitable binders include saturated polyester resins having a number average molecular weight of at least 4000. They may have been built up from one or more aromatic polycarboxylic acids, for instance: terephthalic acid, and one or more polyols, for instance: ethylene glycol. It is preferred to employ as binder a hydrolysed or non-hydrolysed ethyl silicate or epoxy resins such as phenolic glycidyl ethers, for instance: bisglycidyl ethers of Bisphenol-A. Examples of suitable epoxy resins include resins having a number average molecular weight of at least 4000 up to a value in actual practice of the order of 60000, which are physically drying. Epoxy resins having a relatively low molecular weight may be cured with the aid of, for instance, suitable amines, amides or bisocyanates.

Depending on the composition of the first coat and the method of application, the thickness of the first coat is generally in the range of about 15 to about 150 $\mu$m, preferably in the range of 30-80 $\mu$m. Optimum results are obtained by subjecting the coat of zinc dust paint to a drying treatment, for instance at ambient temperature for about 24 hours or for instance for 20 minutes at 120° C. in such a way that it no longer swells or dissolves in the solvent of the second coat to be subsequently applied, but there is no absolute need for such additional treatment.

For the second coat of the corrosion resistant system according to the invention, however, it is the binder which is of major importance. According to the invention the second coating compositions contains as binder an aromatic/aliphatic polyhydroxyether having a number average molecular weight of at least 4000, or a saturated aromatic polyester resin having a number average molecular weight of at least 4000. Examples of suitable aromatic/aliphatic polyhydroxyethers include the phenoxy resins that are commercially available under the trade names Phenoxy PKHC and Phenoxy PKHH of Union Carbide, and under the trade names Epikote OL53 and Epikote OL55 of Shell and under the trade names Epotuf 38533, 38534 and 58535 of Reichhold. These binders have been discussed hereinbefore in more detail along with the binders to be used in the zinc dust paint to be applied as the first coat and need not be further described here.

According to the invention the volume ratio of binder to pigment in the second composition should be in the range of 50:50 to 95:5, and preferably in the range of 65:35 to 75:25. The pigments to be used according to the invention have a Mohs hardness of at least 2 and are generally inert relative to the structural steel that is used as substrate. It is preferred that the pigment should be non-anodic to steel. Examples of suitable pigments include chalk, magnetite, quartz, ferrophosphorus and silicum carbide and colouring pigments such as titanium dioxide, carbon black, chromium oxide green and red iron oxide. An example of an extremely suitable pigment is micaceous iron oxide. It is preferred that the pigment should consist of at least 50% by weight, and more particularly at least 55% by weight of micaceous iron oxide. However, the use is admissable of relatively small amounts of pigments, such as zinc dust and aluminium powder in an amount of, for instance, not more than 40% by weight, based on the total amount of pigments.

There may further be present, if desired, a corrosion resistant pigment or corrosion inhibitor in a small amount of, for instance, not higher than 10, and preferably not higher than 5 percent by weight, based on the total amount of pigment. The incorporation into the second composition of the pigment system according to the invention leads to obtaining a non-slip or unsmooth surface. Compounds such as graphite and molybdenum sulphide are very soft and have a Mohs hardness not higher than 1 and they are not suitable according to the invention for use in the second composition.

Like the zinc dust paint the second composition generally contains a suitable solvent for the binder used, for instance an ester such as ethyl acetate or butyl acetate, a ketone such as methylethyl ketone, and glycols such as ethylene glycol or propylene glycol. Very often use is made of mixtures of the above-envisaged solvents in combination, if desired, with one or more aliphatic and/or aromatic hydrocarbons. The compositions contain the solvent in an amount which is generally in the range of about 15 to about 80 percent by weight. The second composition does not contain water as dispersing agent. Further, the above compositions may optionally contain usual additives, for instance viscosity-controlling agents.

The second composition is generally applied in a coating thickness of 15 to 150 μm, preferably 40 to 100 μm. The composition may be applied to the steel in any convenient manner, for instance by brushing, spraying, flow coating or dipping, and preferably by spraying, more particularly airless spraying. Optionally, each of the compositions may be applied in several layers. Between applying the various layers or after applying the last layer the paint system may be dried at ambient temperature or optionally in a forced manner with the aid of air having a temperature not higher than 150° C.

According to the invention the corrosion resistant system may be applied to any kind of steel, for instance a grade 37 steel or a grade 51 steel. The steel should previously be cleaned and derusted, which is generally done exclusively by blasting. Blasting may be done in the usual manner, for instance by using sand, corundum, glass beads, copper slag and steel grit.

The invention will be illustrated but not limited by the following examples. In them the degree of resistance to corrosion is designated in accordance with ISO 4628/1-1978(E), the degree Ri 0 indication that there is no detectable corrosion and the degree Ri 5 that there is a very high degree of corrosion. The corrosion is brought about by a salt fog in accordance with ASTM B117-64 at 35° C. over a period of 3000 hours in Example I or for 1000 hours in the other examples.

EXAMPLE I

A blasted steel structural steel member (steel grade No. 37) was coated with a composition made up of 9 parts by weight of a binder, 90 parts by weight of zinc dust having an average particle size of 2-4 μm and 1 part by weight of strontium chromate. The binder was made up of 40 percent by weight of Bisphenol-A epoxy resin having a molecular weight of 900 (marketed by Shell under the trade name Epikote 1001), 20 percent by weight of a polyamino amide (marketed by Schering under the trade name Euredur 115) and 40 percent by weight of an aromatic/aliphatic polyhydroxyether having a molecular weight of about 30000 (marketed by Union Carbide under the trade name Phenoxy PKHC). Per 100 parts by weight of solid matter the composition contained 23 parts by weight of a solvent mixture consisting of 40 percent by weight of xylene, 30 percent by weight of ethylglycol acetate and 30 percent by weight of ehtylene glycol.

After the structural member had been dried for about 24 hours at about 20° C. the thickness of the undercoat was 20 μm. Subsequently, a second coat was applied which was made up of 50 parts by weight of the aromatic/aliphatic polyhydroxyether, one of the constituents of the binder that had been used in the first coat, 49 parts by weight of micaceous iron oxide, 1 part by weight of strontium chromate and 105 parts by weight of ethylglycol acetate. In this second coat the volume ratio of the binder to the pigment was 80:20. After the second coat had been left to dry for 14 days at about 20° C. and found to have a thickness of 20 μm, the structural member was subjected to a salt spray test. The degree of corrosion was Ri 0.

EXAMPLE II

The same procedure was used as in Example I, except that use was made of an aromatic/aliphatic polyhydroxyether (marketed by Union Carbide under the trade name Phenoxy PKHH) as binder in the two coats. In the second coat the volume ratio of the binder to the pigment was 80:20. The degree of corrosion was Ri 0.

EXAMPLE III

The same procedure was used as in Example I, except that use was made of an aromatic/aliphatic polyhydroxyether (marketed by Union Carbide under the trade name Phenoxy PKHC) as binder in the two coats. In the second coat the volume ratio of the binder to the pigment was 80:20. The degree of corrosion was Ri 0.

EXAMPLE IV

The same procedure was employed as in Example I, except that use was made of a polyester resin having a number average molecular weight of 14000 and built up from a aromatic dicarboxylic acid and an aliphatic diol (marketed by Dynamit Nobel under the trade name Dynapol L 205) as binder in the two coats. In the second coat the volume ratio of the binder to the pigment was 80:20. The degree of corrosion was Ri 0.

EXAMPLE V

The same procedure was employed as in Example I, except that use was made of an aromatic/aliphatic polyhydroxyether (marketed by Shell under the trade name Epikote OL 53) as binder in the two coats. The degree of corrosion was Ri 0.

EXAMPLE VI

The same procedure was employed as in Example I, except that the binder used in the two coats was ethyl silicate. The degree of corrosion was Ri 0.

COMPARATIVE EXAMPLE A

The same procedure was employed as in Example III, except that use was made of a mixture of a Bisphenol-A epxoy resin (marketed by Shell under the trade name Epikote 1001) and a polyamido amine having an amine number of 240-260 (marketed by Schering under the trade name Euredur 115) as binder. The degree of corrosion was Ri 5.

COMPARATIVE EXAMPLE B

The same procedure was employed as in Example III, except that use was made of hydroxyl groups-containing vinyl chloride resin (marketed by Union Carbide under the trade name Vinylite VROH) as binder. The degree of corrosion was Ri 5.

COMPARATIVE EXAMPLE C

The same procedure was employed as in Example III, except that use was made of a mixture of a hydroxyl groups-containing polyester (marketed by Bayer under the trade name Desmophen 650) and a polyfunctional aliphatic isocyanate (marketed by Bayer under the trade name Desmodur N) as binder. The degree of corrosion was Ri 5.

COMPARATIVE EXAMPLE D

The same procedure was employed as in Example III, except that use was made of a chlorinated rubber (marketed by Bayer under the trade name Pergut S 20) as binder. The degree of corrosion was Ri 5.

COMPARATIVE EXAMPLE E

The same procedure was used as in Example III, except that use was made of an alkyd resin modified with linseed oil (marketed by Kunstharsfabriek Synthese under the trade name Setal 16 WX 65) as binder. The degree of corrosion was Ri 5.

What is claimed is:

1. A process for applying a corrosion resistant system to structural steel, characterized in that to the steel there is successively applied a coat consisting of a zinc dust paint based on a binder and a pigment, the weight ratio of binder to pigment being in the range of 5:95 to 15:85 and the pigment consisting essentially of 55 to 100 percent by weight of metallic zinc and a coat to a composition based on a binder in the form of an aromatic-/aliphatic polyhydroxyether and/or a saturated aromatic polyester resin having a number average molecular weight of at least 4000, and a pigment having a Mohs hardness of at least 2, and the volume ratio of the binder to the pigment is in the range of 50:50 to 95:5, the thickness of the first coat being about 15 to 150 μm and that of the second coat about 15 to about 150 μm.

2. The process of claim 1, wherein in addition to zinc the zinc dust paint contains another electrically conductive pigment.

3. The process of claim 1, wherein the zinc dust paint contains a corrosion resistant pigment or a corrosion inhibitor in an amount which is not more than 10 percent by weight, based on the total amount of pigment.

4. The process of claim 1, wherein the binder contained in the zinc dust paint is ethyl silicate.

5. The process of claim 1, wherein the binder contained in the zinc dust paint is an epoxy resin.

6. The process of claim 5, wherein the epoxy resin is a bisglycidyl ether of Bisphenol-A.

7. The process of claim 1, wherein in the second coat the volume ratio of binder to pigment is in the range of 65:35 to 75:25.

8. The process of claim 1, wherein the pigment contained in the second coat is micaceous iron oxide.

9. The process of claim 8, wherein the pigment comprises at least 50 percent by weight of micaceous iron oxide.

10. The process of claim 9, wherein the pigment comprises at least 55 percent by weight of micaceous iron oxide.

11. Structural steel provided with a corrosion resistant system obtained by the process of any one of the claims 1 to 10.

12. A process for improving the corrosion resistance of a corrodible structural steel surface which comprises coating said surface with a paint consisting of from 85 to 95 percent by weight of a pigment and from 5 to 15 percent by weight of a binder, the pigment consisting essentially of 55 to 100 percent by weight of particulate zinc and then coating the resulting painted surface with a coating composition consisting of from 5 to 50% by volume of a pigment having a MOHS hardness of at least 2 and a binder comprising a polyhydroxy ether and a saturated aromatic polyester resin having a number average molecular weight of at least 4000 or consisting of said saturated aromatic polyester resin, and thickness of the paint coating being from about 15 to 150 μm and that of the coating applied to the painted surface being about 15 to about 150 μm.

* * * * *